No. 753,525. PATENTED MAR. 1, 1904.
J. R. SMITH.
BALL AND SOCKET FASTENER.
APPLICATION FILED JULY 20, 1903.
NO MODEL.
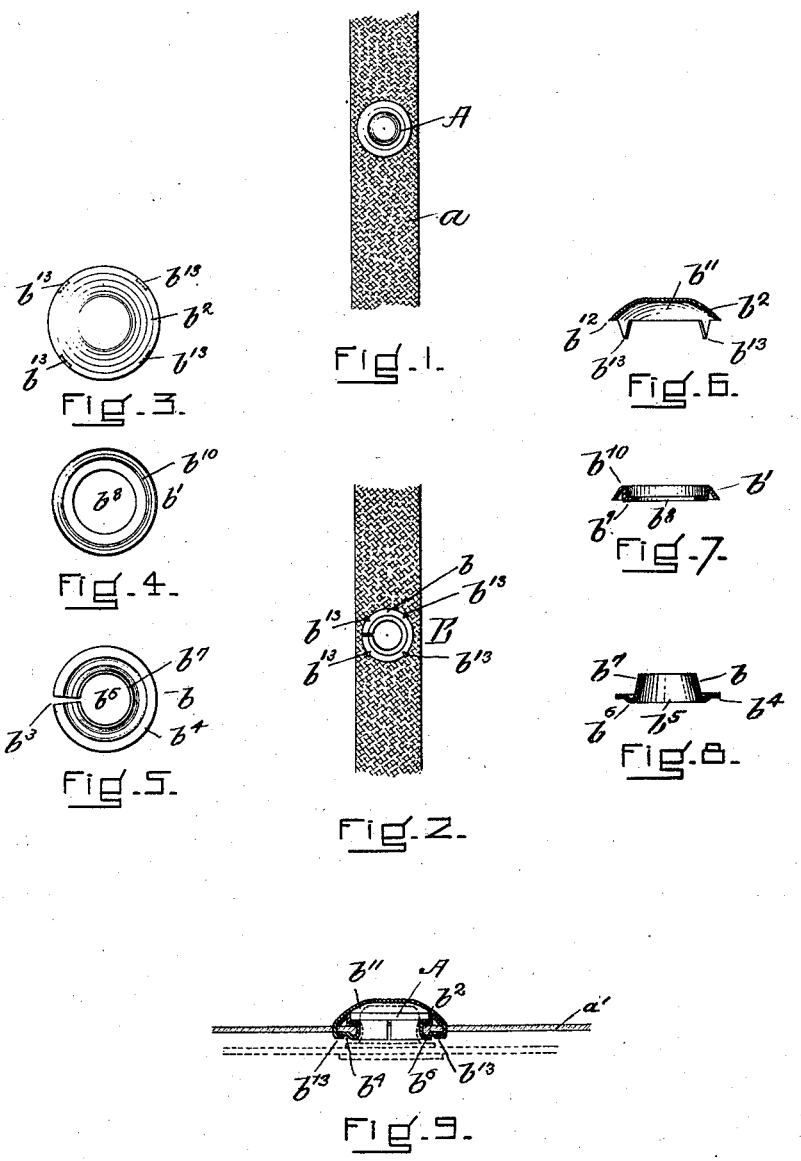

No. 753,525. Patented March 1, 1904.

UNITED STATES PATENT OFFICE.

JOSEPH R. SMITH, OF WATERBURY, CONNECTICUT, ASSIGNOR TO UNITED STATES FASTENER COMPANY, OF PORTLAND, MAINE, AND BOSTON, MASSACHUSETTS, A CORPORATION OF MAINE.

BALL-AND-SOCKET FASTENER.

SPECIFICATION forming part of Letters Patent No. 753,525, dated March 1, 1904.

Application filed July 20, 1903. Serial No. 166,258. (No model.)

*To all whom it may concern:*

Be it known that I, JOSEPH R. SMITH, a citizen of the United States, and a resident of Waterbury, in the county of New Haven and State of Connecticut, have invented a new and useful Improvement in Ball-and-Socket Fasteners, of which the following is a full, clear, and exact description, reference being had to the accompanying drawings, forming a part of this specification, in explaining its nature.

The invention relates to the type of fasteners known as "ball-and-socket" and which includes as one member a ball and as the other member a socket, which members are adapted to resiliently engage and disengage. I have herein represented the resiliency as imparted to the socket member, but this is not material, as it may reside in the ball member or in both.

The invention relates especially to the way in which the cap for the socket member is used and applied to the part of the article or material to which the socket member is secured and also to the employment of such means as a reinforcement to the remainder of the socket member when it is provided with resiliency.

I will now describe the invention in conjunction with the drawings, forming a part of this specification, wherein—

Figure 1 is a view in plan representing the ball member as attached to a tape. Fig. 2 is a view in plan representing one side of the socket member as attached to a tape. Fig. 3 is a view in plan of the cap. Figs. 4 and 5 are views in plan of parts of other portions of the socket member; Fig. 6, a view in vertical section of the cap, and Figs. 7 and 8 similar views of Figs. 4 and 5. Fig. 9 is a view showing the cap and other parts of the socket member as combined with a tape and also showing by dotted lines the ball member in engagement therewith.

The ball member A may be of any structure and attached to the tape $a$ or any article with which it may be used in the customary manner.

The socket member B, with which I have represented my invention as employed, is made in three parts—viz., the socket-piece $b$, the washer $b'$, and the cap $b^2$. The socket-piece $b$ may be made resilient by means of a slit $b^3$, (see Fig. 5,) extending through its flange and wall or in any other way. It is shown as having the outer depressed finishing-flange $b^4$, the socket-entrance $b^5$, surrounding bead $b^6$, and the tubular section $b^7$. The washer $b'$ has the hole $b^8$, the seat $b^9$, and the annular raised part $b^{10}$, having on one side a vertical wall and on the other an inclined one. The washer is used upon the surface of the material opposed to that against which the flange $b^4$ of the socket-piece bears, and they are associated together by passing the part $b^7$ of the socket-piece through a hole in the material $a'$ to which it is to be attached and through the hole $b^8$ in the washer and upsetting its end upon the shoulder $b^9$ of the washer. This securely attaches the socket-piece to the material, but it does not leave the socket-piece and washer in a finished condition, as the hole in the washer and the upset end of the socket-piece are in sight. I therefore complete the socket member by means of the cap $b^2$. This preferably has a rounded or curved shape, as shown, forming a cavity $b^{11}$. It also has the edge $b^{12}$ surrounding the cavity and forming its base, and which practically is continuous with the exception of the pointed extensions or prongs $b^{13}$, which are in line with the edge and which may be made of any desired length. The cavity is made of a sufficient size to receive and contain the washer $b'$ and to bring its base adjacent to the outer edge thereof and the pointed extensions or prongs $b^{13}$ when passed through the material to the edge of the flange $b^4$ of the socket-piece, and the cap thus formed is assembled with the other of the parts of the socket member by being placed over the washer, and by having its pointed extensions or prongs forced through the material adjacent to the edges of the washer and of the socket-piece flange until the base $b^{12}$ of the cap bears against the material the cap completely incloses the washer and the prongs placed through the material. The ends of the pointed extensions or prongs are then bent upon the flange $b^4$ of the socket-piece, as represented in Fig. 2, thereby firmly uniting the cap to said flange. It is not necessary, however, that the pointed extensions or prongs engage the flange, although I prefer that they should do this, and especially do I prefer this when the socket-piece is provided with resiliency, as described, for the pointed extensions or prongs closing against the edge of the flange of the socket-piece then act as reinforcements to its springing property, and to that extent increases its stress and its life.

Having thus fully described my invention, I claim and desire to secure by Letters Patent of the United States—

1. In a fastener for gloves of the character specified, the socket member comprising a socket, an annular means for fastening said socket to material, and an imperforate cap shaped to inclose said annular means and having at its edge prongs adapted to pass through the material and fasten it.

2. In a socket member of a fastener, a socket-piece, means for fastening said socket-piece to material, and an independent cap covering said means and having prongs to pass into the material and fasten it thereto, independent of the socket-piece or its fastening means.

3. In a socket member of a fastener, a socket-piece, means for fastening said socket-piece to material, an independent cap to cover said means having prongs to extend through the material to turn upon the flange of the socket-piece.

4. In a socket member of a fastener, a socket-piece having a bead about the socket-entrance and a depressed flange, means for fastening said socket-piece to material, and an independent cap to cover said means having prongs which pass through the material and are turned upon the flange of the socket-piece outside the bead.

5. In a socket member of a fastener, the socket-piece having a yielding mouth, means for fastening said socket-piece to material, and an independent cap to cover said means, having prongs which pass through the material and which are spaced to bear against the edge of the socket-piece and to reinforce its yielding properties.

6. A socket member of a fastener having a socket part, means for fastening said socket part to material upon the side of the material opposite the socket-entrance, and a cap upon said side to cover said means and connected with the flange of the socket part upon the opposite side of the material by extensions which pass through the material, there uniting the cap to the socket part.

7. A socket member of a fastener having a socket part, means for fastening said socket part to material upon the side of the material opposite the socket-entrance, an independent cap upon said opposite side, fastened over the said fastening means, and means for fastening said cap to the material after said socket part and fastening means have been secured together to the material.

JOSEPH R. SMITH.

In presence of—
S. A. GEIGER,
A. C. MINTIE.